(12) United States Patent
Fan et al.

(10) Patent No.: US 11,950,274 B2
(45) Date of Patent: Apr. 2, 2024

(54) METHOD FOR SCHEDULING LOGICAL CHANNEL, METHOD FOR GENERATING CONFIGURATION INFORMATION, AND DEVICE

(71) Applicant: Beijing Unisoc Communications Technology Co., Ltd., Beijing (CN)

(72) Inventors: Huifang Fan, Beijing (CN); Lifeng Han, Beijing (CN); Xiangxin Gu, Beijing (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 389 days.

(21) Appl. No.: 17/420,423

(22) PCT Filed: Nov. 11, 2019

(86) PCT No.: PCT/CN2019/117124
§ 371 (c)(1),
(2) Date: Jul. 2, 2021

(87) PCT Pub. No.: WO2020/119358
PCT Pub. Date: Jun. 18, 2020

(65) Prior Publication Data
US 2022/0086859 A1 Mar. 17, 2022

(30) Foreign Application Priority Data
Dec. 11, 2018 (CN) .......................... 201811511538.3

(51) Int. Cl.
*H04W 72/543* (2023.01)
*H04W 28/02* (2009.01)
*H04W 72/23* (2023.01)
*H04W 72/51* (2023.01)
*H04W 72/566* (2023.01)

(52) U.S. Cl.
CPC ..... *H04W 72/543* (2023.01); *H04W 28/0268* (2013.01); *H04W 72/51* (2023.01); *H04W 72/569* (2023.01); *H04W 72/23* (2023.01)

(58) Field of Classification Search
CPC .. H04L 5/0048; H04L 5/001; H04W 72/0446; H04W 72/0453
See application file for complete search history.

(56) References Cited

U.S. PATENT DOCUMENTS

| 2010/0118812 A1 | 5/2010 | Kim et al. |
| 2013/0152168 A1 | 6/2013 | Nasir et al. |
| 2018/0248663 A1 | 8/2018 | Mueller |

FOREIGN PATENT DOCUMENTS

| CN | 103580778 A | 2/2014 |
| CN | 106171032 A | 11/2016 |

(Continued)

OTHER PUBLICATIONS

Khoueiry, Boulus Wadih, "A Novel Machine to Machine Communication Strategy Using Rateless Coding for the Internet of Things," IEEE Internet of Things Journal, Jan. 2016, vol. 3, No. 6, pp. 937-950, 10.1109/JIOT.2016.2518925.

(Continued)

*Primary Examiner* — Natasha W Cosme
(74) *Attorney, Agent, or Firm* — Womble Bond Dickinson (US) LLP

(57) ABSTRACT

The present disclosure relates to a method for scheduling a logical channel, a method for generating configuration information and a device. The method for scheduling a logical channel comprises: determining, according to logical channel configuration information, a coverage area of each logical channel, the configuration information comprising coverage area information of the logical channel; selecting, according to a transmission distance of a grant, a logical channel having a coverage area matching the transmission (Continued)

distance; and allocating a resource to the selected logical channel, and completing scheduling. The method for generating configuration information comprises: generating configuration information according to service quality information of a service, the configuration information comprising coverage area information of each logical channel; and sending the configuration information to user equipment. The invention achieves generation of logical channel configuration information comprising coverage area information and scheduling of a logical channel according to the configuration information. The method for scheduling a logical channel, the method for generating configuration information, and the device according to embodiments of the present disclosure ensure that a transmission distance requirement is met during a communication process, thereby enhancing communication performance.

13 Claims, 6 Drawing Sheets

(56) References Cited

FOREIGN PATENT DOCUMENTS

| | | |
|---|---|---|
| CN | 107920390 A | 4/2018 |
| WO | 2013027024 A1 | 2/2013 |
| WO | 2018061438 A1 | 4/2018 |

OTHER PUBLICATIONS

Huawei, HiSilicon, "QoS management for NR V2X," 3GPP TSG RAN WG1 Meeting #95 agenda notes, agenda item 7.2.4.4, Document No. R1-1812214, Nov. 12-16, 2018, Spokane, US.
Vivo, "Communication range for NR V2X," 3GPP TSG-RAN WG2 Meeting#104 agenda notes, agenda item 11.4.5, Document No. R2-1817111, Nov. 12-16, 2018, Spokane, US.
You-Bao, Lou et al., "Research on LTE PDCCH Blind Detect Process," Video Engineering, 2010, vol. 34, No. 12, School of Communication and Information Engineering, Chongqing University of Posts and Telecommunications Chongqing 400065, China.
3GPP, "3rd Generation Partnership Project; Technical Specification Group Radio Access Network; NR; Medium Access Control (MAC) protocol specification (Release 15)," Technical Specification, 2018-2019, 3GPP TS 38.321, Valbonne, France.
Spreadtrum Communications, "Logical channel prioritization Consideration," document No. R2-1905680, agenda item 11.4.2 for 3GPP TSG-RAN WG2 Meeting #106, May 13-17, 2019, Reno, NV, USA.
Huawei, HiSilicon, "QoS support for NR V2X," document No. R2-1813935 agenda item 11.4.5 for 3GPP TSG-RAN WG2 Meeting #103-Bis, Oct. 8-12, 2018, Chengdu, China.
Vivo, "Discussion on resource allocation mechanism for NR sidelink," document No. R2-1817109, agenda item 11.4.2.4 for 3GPP TSG-RAN WG2 Meeting #104, Nov. 12-16, 2018, Spokane, WA, USA.

METHOD FOR SCHEDULING LOGICAL CHANNEL, METHOD FOR GENERATING CONFIGURATION INFORMATION, AND DEVICE

CROSS-REFERENCE TO RELATED APPLICATION

This application claims priority of Chinese Patent Application entitled "METHOD FOR SCHEDULING LOGICAL CHANNEL, METHOD FOR GENERATING CONFIGURATION INFORMATION, AND DEVICE" filed on Dec. 11, 2019, with the Application No. 201811511538.3, which is incorporated herein by reference in its entirety.

TECHNICAL FIELD

The present disclosure relates to the field of a wireless communication, and in particular to a method and device for logical scheduling channel and for generating configuration information.

BACKGROUND

Currently, in a wireless communication process of 3G, Long Term Evolution (LTE), or 5G New Radio (NR), a Media Access Control (MAC) layer is responsible for multiplexing a plurality of logical channels onto a same transmission channel to implement logical channel scheduling.

In the above process of logical channel scheduling, different logical channels may be formed into a transport block by the MAC layer according to information such as priority of the logical channels, to submit the transport block to a physical layer for transmission, thereby improving communication efficiency. However, in a research on 3rd Generation Partnership Project (3GPP) New Radio (NR) Vehicle to Everything (V2X), requirements are made on communication distance of a direct communication between User Equipment (UE). At present, requirements on distance are not yet considered in the management mechanism related to QoS (Quality of Service) of direct communication between UEs or communication between UE and a base station. Therefore, in the research on NR V2X, how to introduce requirements on distance of UEs into the wireless communication process of UEs becomes an urgent problem to be solved.

SUMMARY

In view of the above, the present disclosure provides a method and device of scheduling logical channel and a method and device of generating configuration information, which can configure adaptive coverage areas for different logical channels, thereby filtering out logical channels with inappropriate areas in scheduling logical channels and improving scheduling performance.

According to a first aspect of the present disclosure, there is provided a logical channel scheduling method, the method being applied to user equipment, wherein the method includes: determining a coverage area of each of logical channels according to configuration information of the respective logical channel, the configuration information comprising coverage area information of the respective logical channel; selecting, according to a transmission distance of a grant, a logical channel whose coverage area matches the transmission distance; and allocating a resource for the selected logical channel to complete scheduling.

In a possible implementation, the selecting, according to a transmission distance of grant, a logical channel whose coverage area matches the transmission distance includes: selecting, according to the transmission distance of grant, a logical channel whose coverage area is within the transmission distance of grant In a possible implementation, the method further includes: acquiring configuration information according to quality of service information of traffic, the configuration information comprising coverage area information of each of the logical channels; and configuring the respective logical channel according to the configuration information.

In a possible implementation, the acquiring configuration information according to quality of service information of traffic includes: receiving configuration information transmitted by a base station, the configuration information being generated by the base station according to the quality of service information of the traffic.

In a possible implementation, the acquiring configuration information according to quality of service information of traffic includes: generating the configuration information according to the quality of service information of the traffic.

In a possible implementation, the generating configuration information according to quality of service information of traffic includes: matching the traffic with different quality of service requirements to the logical channels; mapping data packets in the traffic into corresponding logical channels according to the matching result; and generating the configuration information according to quality of service information within the data packets.

According to a second aspect of the present disclosure, there is provided a method of generating logical channel configuration information, the method being applied to a base station, wherein the method includes: generating configuration information according to quality of service information of traffic, the configuration information including coverage area information of each of logical channels; and transmitting the configuration information to user equipment.

In a possible implementation, the generating configuration information according to quality of service information of traffic includes: acquiring the quality of service information of the traffic; and converting a result of the acquisition into corresponding configuration information according to an operating mode of the user equipment.

In a possible implementation, a manner of acquiring the quality of service information of the traffic includes: performing acquisition according to a non-access stratum message of a core network or acquisition according to the quality of service information reported by the user equipment.

In a possible implementation, the converting a result of acquisition into corresponding configuration information according to an operating mode of the user equipment includes: converting the result of acquisition into directly-configurable configuration information when the user equipment operates in a directly-configurable mode; and converting the result of acquisition into pre-configurable configuration information when the user equipment operates in a pre-configurable mode.

According to a third aspect of the present disclosure, there is provided a logical channel scheduling device, including: a coverage area determination unit configured to determine a coverage area of each of logical channels according to configuration information of the respective logical channel, the configuration information comprising coverage area information of the respective logical channel; a logical channel selection unit configured to select, according to a transmission distance of a grant, a logical channel whose coverage area matches the transmission distance; and a logical channel scheduling unit configured to allocate a resource for the selected logical channel to complete scheduling.

In a possible implementation, the logical channel selection unit is configured to select, according to a transmission distance of the grant, a logical channel whose coverage area is within the transmission distance of the grant.

In a possible implementation, the device further includes: a configuration information acquisition unit configured to acquire configuration information according to quality of service information of traffic, the configuration information comprises coverage area information of each of the logical channels; and a logical channel configuration unit configured to configure the logical channel according to the configuration information.

In a possible implementation, the configuration information acquisition unit is configured to receive configuration information transmitted by a base station, the configuration information being generated by the base station according to the quality of service information of the traffic.

In a possible implementation, the configuration information acquisition unit is configured to generate configuration information according to the quality of service information of the traffic.

In a possible implementation, the generating configuration information according to quality of service information of traffic includes: matching the traffic with different quality of service requirements to the logical channels; mapping data packets in the traffic into corresponding logical channels according to the matching result; and generating the configuration information according to quality of service information within the data packets.

According to a fourth aspect of the present disclosure, there is provided a device of generating logical channel configuration information, including: a configuration information generation unit configured to generate configuration information according to quality of service information of traffic, the configuration information including coverage area information of each of logical channels; and a configuration information transmission unit configured to transmit the configuration information to user equipment.

In a possible implementation, the configuration information generating unit is configured to: acquire quality of service information of the traffic; and convert a result of the acquisition into corresponding configuration information according to an operating mode of the user equipment.

In a possible implementation, the converting a result of acquisition into corresponding configuration information according to an operating mode of the user equipment includes: converting the result of acquisition into directly-configurable configuration information when the user equipment operates in a directly-configurable mode; and converting the result of acquisition into pre-configurable configuration information when the user equipment operates in a pre-configurable mode.

According to a fifth aspect of the present disclosure, there is provided a logical channel scheduling device, including: a processor; and a memory configured to store processor executable instructions, wherein the processor is configured to execute the method according to the first aspect.

According to a sixth aspect of the present disclosure, there is provided a device of generating logical channel configuration information, including: a processor; and a memory configured to store processor executable instructions, wherein the processor is configured to execute the method according to the second aspect According to a seventh aspect of the present disclosure, there is provided a non-volatile computer readable storage medium having stored thereon computer program instructions which, when executed by a processor, implement the method according to the first aspect.

According to an eighth aspect of the present disclosure, there is provided a non-volatile computer readable storage medium having stored thereon computer program instructions which, when executed by a processor, implement the method according to the second aspect.

By generating, according to quality of service information of the traffic, configuration information including coverage area information of each of logical channels, and transmitting the configuration information to a user equipment, the method and device for generating logical channel configuration information according to embodiments of the present disclosure can convert requirements on distance of direct communication between UEs onto the coverage areas of the logical channels, and solve the problem that requirements on communication distance between UEs cannot be considered in the prior art.

With configuration information including coverage area information of each of logical channels, determining coverage area of each of the logical channels according to the coverage area information, selecting, according to a transmission distance of grant, logical channels whose coverage areas match the transmission distance, and allocating resources for the selected logical channels to complete scheduling, the method and device for scheduling logical channel according to embodiments of the present disclosure can filter out logical channels with inappropriate areas in the process of scheduling logical channel, thereby improving scheduling efficiency and performance, and improving communication efficiency.

Other features and aspects of the present disclosure will become apparent from the following detailed description of exemplary embodiments with reference to the accompanying drawings.

BRIEF DESCRIPTION OF THE DRAWINGS

The accompanying drawings, which are incorporated in and constitute a part of the specification, illustrate exemplary embodiments, features, and aspects of the present disclosure and, together with the description, serve to explain the principles of the present disclosure.

DETAILED DESCRIPTION

Figure 1:
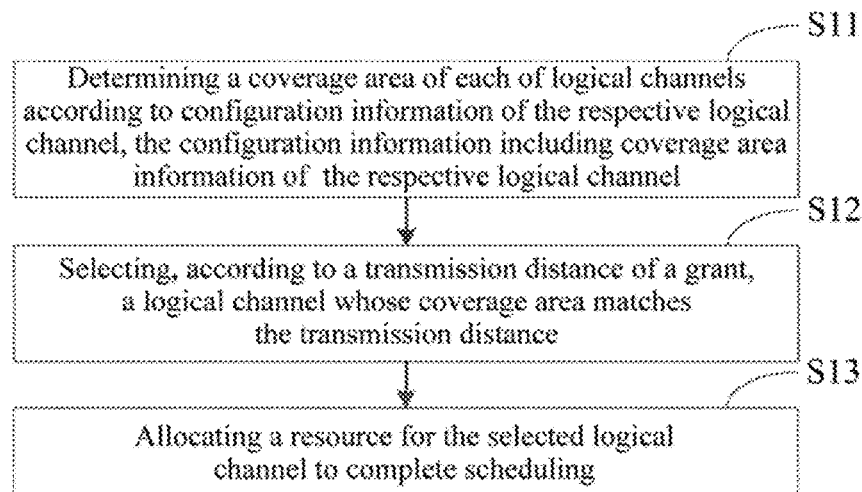
FIG. 1 illustrates a flowchart of a logical channel scheduling method according to an embodiment of the present disclosure.

Various exemplary embodiments, features, and aspects of the present disclosure will be described in detail hereinafter with reference to the accompanying drawings. The same reference numerals in the drawings denote elements having the same or similar functions. Although various aspects of the embodiment are shown in the drawings, the drawings are not necessarily to drawn to scale unless otherwise specified.

The special term "exemplary" here means "serving as an example, an embodiment, or an illustration". Any embodiment described herein as "exemplary" need not be construed as being superior or better than other embodiments.

In addition, in the following detailed embodiments, numerous specific details are set forth in order to better explain the present disclosure. Those skilled in the art will understand that, the present disclosure may also be practiced without certain specific details. In some instances, those methods, means, elements, and circuits well known to those skilled in the art are not described in detail in order to highlight the gist of the present disclosure.

FIG. 1 illustrates a flowchart of a logical channel scheduling method according to an embodiment of the present disclosure. The method may be performed by a user equipment, for example, by a Media Access Control (MAC) layer of the user equipment. As shown in FIG. 1, the method may include:

step S11: determining a coverage area of each of logical channels according to configuration information of the respective logical channel, the configuration information including coverage area information of the respective logical channel;

step S12: selecting, according to a transmission distance of a grant, a logical channel whose coverage area matches the transmission distance;

step S13: allocating a resource for the selected logical channel to complete scheduling.

In 5G, whether coverage area information of the traffic is used as one of indexes of quality of service (QoS) information has not been determined. Therefore, the quality of service information in the present disclosure refers to general terms of quality of service information of the traffic, which may include QoS information, or coverage area information of the traffic independent of the QoS information. There is no limitation thereto in the present disclosure. For simplicity, the quality of service information in the present disclosure refers to general terms of quality of service information related to the traffic.

The coverage area information may be specific coverage area data, such as a transmission distance of a logical channel, or an approximate coverage area parameter, such as a coverage area level of a logical channel. In an example, the coverage area information of the logical channel is embodied in the form of a minimum transmission distance of the logical channel, and in an example, the coverage area information of the logical channel is embodied in the form of a coverage area level of the logical channel.

In a possible implementation, the Media Access Control (MAC) layer implements scheduling of logical channels, and the scheduling is based on configuration information included in the logical channels. In order to introduce requirements on a distance of a User Equipment (UE) in the communication process into a QoS (Quality of Service) management mechanism of the UE, the configuration information in the present implementation contains coverage area information of each of the logical channels. Therefore, in the process of logical channel scheduling, the MAC layer can determine coverage areas of the logical channels according to coverage area information, filter, according to a transmission distance of the grant, a logical channel whose coverage area matches the transmission distance, and allocate corresponding resource for the filtered logical channel, so as to complete the logical channel scheduling.

In a possible implementation, the selecting, according to a transmission distance of the grant, a logical channel whose coverage area matches the transmission distance may include selecting, according to a transmission distance of the grant, a logical channels whose coverage areas is within the transmission distance of the grant. In a possible example, when the MAC layer of the UE performs logical channel selection, there are three logical channels available for selection, which are Logical Channel (LCH) 1 with the shortest transmission distance of 50 m, LCH2 with the shortest transmission distance of 500 m, and LCH3 with the shortest transmission distance of 1000 m. During the selection, logical channels meeting a condition are filtered according to the shortest communication transmission distance index corresponding to the grant. In this example, the shortest communication transmission distance index corresponding to the grant is 500 m. As described above, the shortest transmission distances required by the LCH1 and LCH2 are 50 m and 500 m respectively, which are within the transmission distance index of the grant. Therefore, the grant can meet the transmission distance requirements of the LCH1 and LCH2. However, since the shortest transmission distance of 1000 m required by LCH3 is greater than 500 m, the transmission distance of the grant may not meet the shortest transmission distance requirement of the LCH3. Therefore, the LCH3 needs to be excluded when selecting the logical channels. The logical channels LCH1 and LCH2 are finally selected. In a possible example, the logical channels available for selection are the same as the logical channels in the previous example, that is, LCH1, LCH2, and LCH3 with the shortest communication transmission distances of 50 m, 500 m, and 1000 m, respectively, but the shortest communication transmission distance index corresponding to the grant is 400 m, so at this time only the shortest transmission distance of 50 m of LCH1 is within the transmission distance index of the grant, and both LCH2 and LCH3 exceed the transmission distance of the grant, so that only LCH1 is finally selected as the logical channel. In an example, there are two logical channels available for selection, i.e., LCHA with a coverage area class of A and LCHB with a coverage area class of B, wherein the transmission distance of the coverage area class of A is in a range from 50 to 500 m, the transmission distance of the coverage area class of B is in a range from 500 to 1000 m, and the shortest communication transmission distance index corresponding to the grant is 400. Therefore, at this time, the transmission distance of the LCHA is within the transmission distance index of the grant, and the transmission distance of the LCHB exceeds the transmission distance of the grant, so that only LCHA is finally selected as the logical channel.

After the logical channel that meets a condition is filtered by the coverage area information of the logical channels, subsequent implementations are not limited herein, wherein a possible implementation is as follows.

Figure 2:
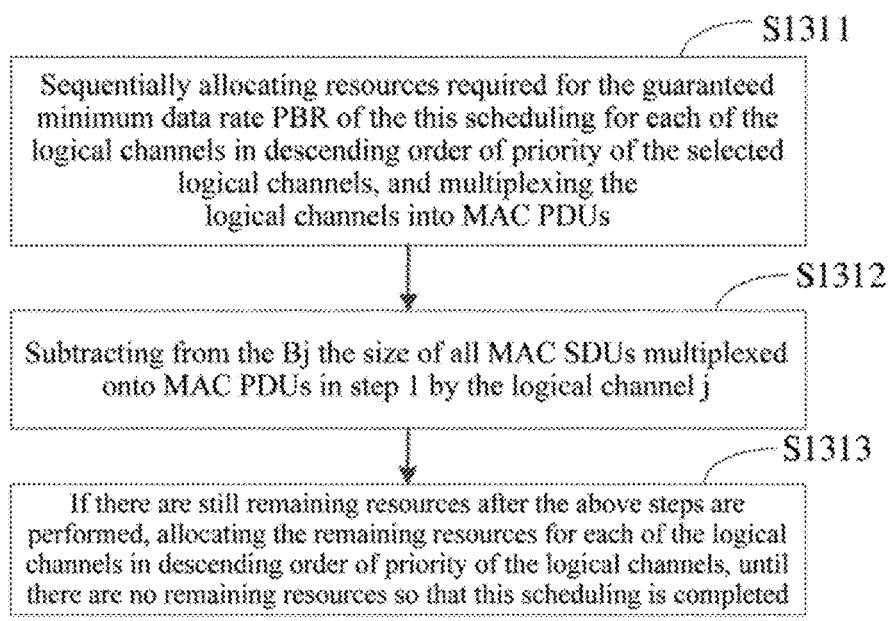
FIG. 2 illustrates a flowchart of a logical channel scheduling method according to an embodiment of the present disclosure.

In a possible implementation, the configuration information of the logical channel may include any of several of the following parameters or any combination thereof: priority of each of the logical channels, Prioritised Bit Rate (PBR), and Bucket Size Duration (BSD) information, wherein the UE maintains for each of the logical channels j a variable Bj indicating the amount of data to be transmitted by the current logical channel. FIG. 2 illustrates a flowchart of an optional logical channel scheduling method according to an embodiment of the present disclosure. As shown in FIG. 2, the step S13 may include:

step S1311: sequentially allocating resources required for the guaranteed minimum data rate Prioritised Bit Rate (PBR) of this scheduling for each of the selected logical channels in descending order of priority of the selected logical channels, and multiplexing the logical channels into MAC Protocol Data Unit (PDU);

step S1312: subtracting from Bj the size of all the MAC Service Data Units (SDUs) multiplexed to the MAC PDUs in step 1 by the logical channel j;

step S1313: if there are still remaining resources after the above steps are performed, allocating the remaining resources for each of the logical channels in descending order of priority of the logical channels, until there is no remaining resources so that this scheduling is completed.

After a logical channel that meets a condition is filtered by the coverage area information of the logical channel, subsequent implementations are not limited herein, wherein a possible implementation is as follows.

Figure 3:
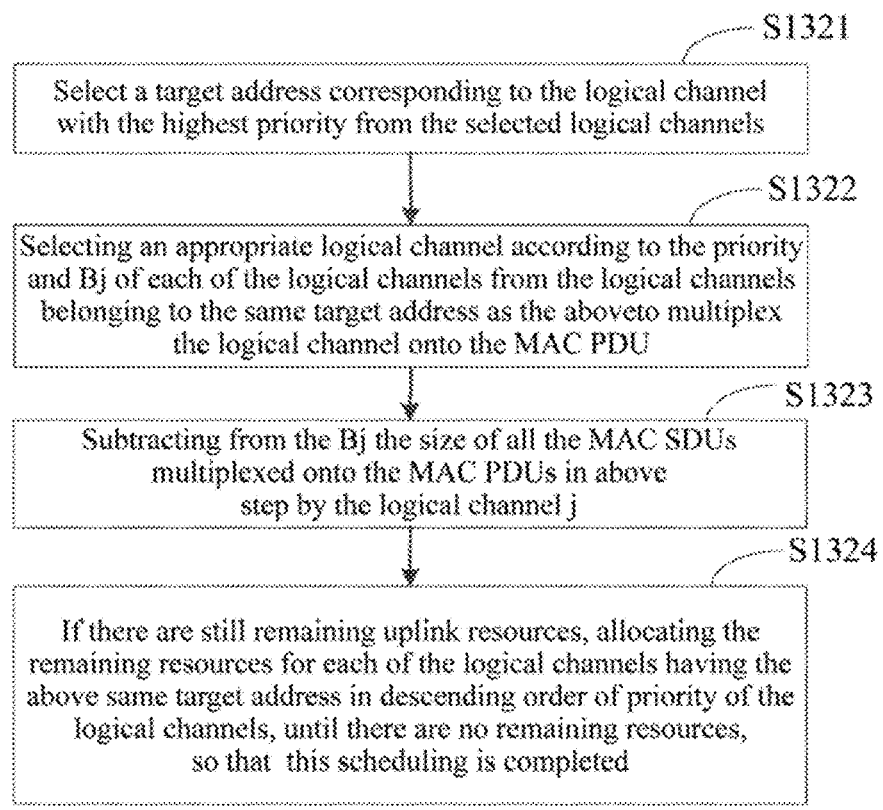
FIG. 3 illustrates a flowchart of a logical channel scheduling method according to an embodiment of the present disclosure.

In a possible implementation, the configuration information of the logical channel may include priority of each of the logical channels. FIG. 3 illustrates a flowchart of an optional logical channel scheduling method according to an embodiment of the present disclosure. As shown in FIG. 3, step S13 may include:

step S1321: selecting a target address corresponding to the logical channel with the highest priority from the selected logical channels;

step S1322: selecting an appropriate logical channel according to priority and Bj of each of the logical channels from the logical channels belonging to the target address same as the above, to multiplex the logical channel onto the MAC PDU;

step S1323: subtracting from the Bj the size of all the MAC SDUs multiplexed to the MAC PDUs in the previous step;

step S1324: if there are still remaining uplink resources, allocating the remaining resources for each of the logical channels having the above same target address in descending order of priority of the logical channels, until there are no remaining resources, so that this scheduling is completed.

In addition, the logical channel may have other configuration parameters and configuration restrictive conditions in addition to the configuration coverage area information, which are specifically described as follows.

In a possible implementation, the configuration information may include configuration parameters and configuration mapping restrictive conditions. In an example, the configuration parameters may be configurations made by a Radio Resource Control (RRC) layer of the base station for the logical channel, and are not limited herein. The configured parameters may include any of several of the following parameters or any combination thereof: priority, prioritised bit rate (PBR, prioritised_bit_rate), and bucket size duration (BSD, Bucket_Size_Duration). In an example, configuration mapping restrictive conditions are restrictions made by the RRC layer on logical channels, which may include any of several of the following parameters or any combination thereof: allowed Subcarrier Spacing SCS List for each of the logical channels, maximum Physical Uplink Shared Channel PUSCH Duration, allowed configured Grant Type configuredGrantType1, and allowed Serving Cells.

In a possible implementation, the selecting, according to a transmission distance of the grant, a logical channel whose coverage area matches the transmission distance further comprises step S122, which may further filter the logical channels whose coverage areas match the transmission distance according to the configuration mapping restrictive conditions.

Figure 4:
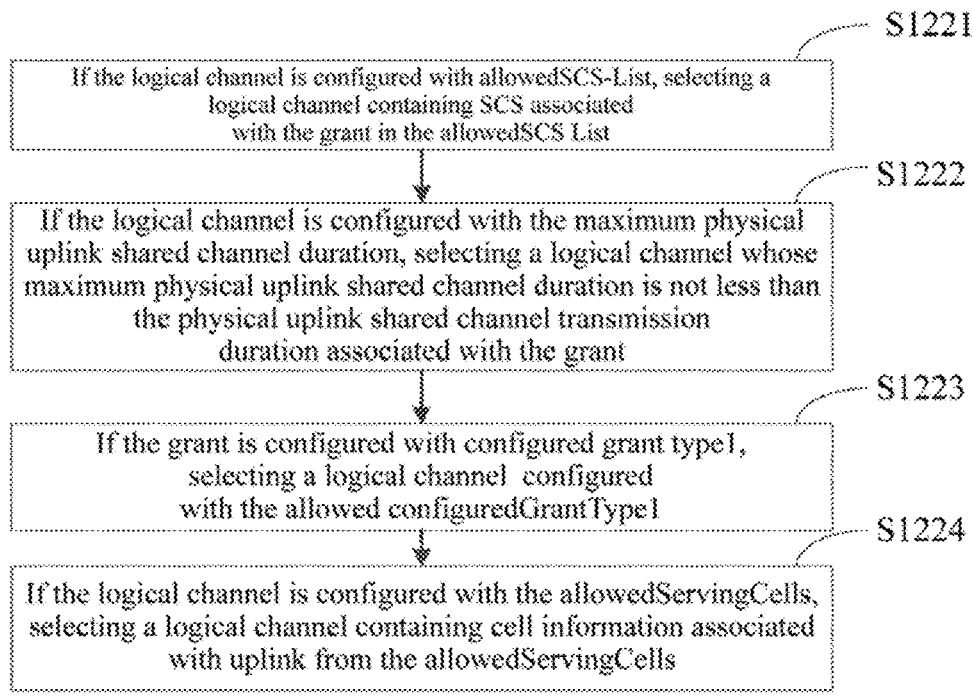
FIG. 4 illustrates a flowchart of a logical channel scheduling method according to an embodiment of the present disclosure.

FIG. 4 illustrates a flowchart of a logical channel scheduling method according to an embodiment of the present disclosure. As shown in FIG. 4, in a possible implementation, step S122 may include:

S1221: if the logical channel is configured with the allowed Subcarrier Spacing (SCS) List, selecting a logical channel containing SCS associated with the grant in the allowed SCS List;

S1222: if the logical channel is configured with the maximum physical uplink shared channel duration, selecting a logical channel whose maximum physical uplink shared channel duration is not less than the physical uplink shared channel transmission duration associated with grant;

S1223: if the grant is configured with the configured grant type1, selecting a logical channel configured with allowed configuredGrantType1;

S1224: if the logical channel is configured with allowedServingCells, selecting a logical channel containing the cell information associated with the uplink in the allowedServingCells.

The above steps S1221 to S1224 may be added or deleted according to the mapping restrictive conditions configured by the base station to ensure correspondence with the configured mapping restrictive conditions. Subsequently, by determining the coverage area of each of the logical channels according to the coverage area information in the logical channel configuration information, logical channels whose coverage areas do not match the transmission distance of the grant can be filtered out directly in the scheduling process, thereby improving the communication efficiency. It should be noted that the order in which the logical channels are filtered by the coverage area conditions of the logical channels configured above and the mapping restriction conditions listed above is not limited.

Figure 5:
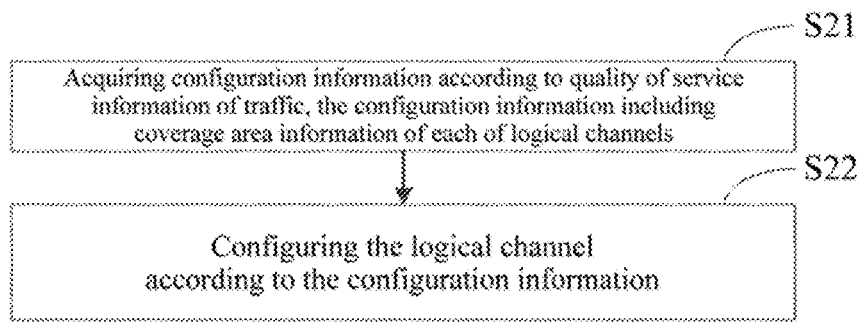
FIG. 5 illustrates a flowchart of a logical channel scheduling method according to an embodiment of the present disclosure.

FIG. 5 illustrates a flowchart of a logical channel scheduling method according to an embodiment of the present disclosure. As shown in FIG. 5, in a possible implementation, the method may further comprise:

S21: acquiring configuration information according to quality of service information of traffic, the configuration information including coverage area information of each of the logical channels; S22: configuring the logical channels according to the configuration information.

The coverage area information and the configuration information in steps S21 to S22 may refer to the coverage area information in steps S11 to S14, and details thereof are not described herein again. It should be noted that the configuration of the logical channel does not limit the implementation, and steps S21 to S22 simply lists one possible implementation. The traffic may be Vehicle to Everything (V2X) traffic or other traffic.

The quality of service information of the traffic may be a quality of service information parameter (QoS parameter) of the traffic, or a coverage area parameter corresponding to the traffic provided separately from the QoS parameter/indicator. In an example, the quality of service information parameter may be 5QI. In an example, the quality of service information parameter may be in the form of PPPP/PPPR or the like. The quality of service information may be either a quality of service information parameter or a quality of service indicator (QoS indicator).

In a possible implementation, there may be numerous implementations in which configuration information is acquired according to quality of service information of traffic, which is not limited herein, and possible ways may be: one way that may be to receive the configuration information transmitted by the base station, the configuration information being generated by the base station according to the quality of service information of the traffic, and the other way that may be to directly generate the configuration information by the user equipment according to the quality of service information of the traffic.

Figure 6:
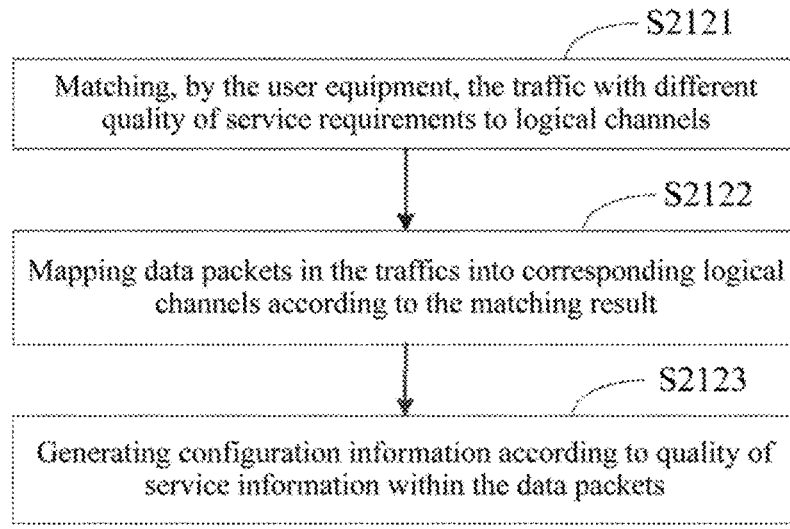
FIG. 6 illustrates a flowchart of a logical channel scheduling method according to an embodiment of the present disclosure.

FIG. 6 shows a flowchart of a logical channel scheduling method according to an embodiment of the present disclosure. As shown in FIG. 6, in a possible implementation, the generating, by the user equipment, configuration information according to quality of service information of traffic may include:
S2121: matching, by the user equipment, traffic with different quality of service requirements to the logical channels;
S2122: mapping data packets in the traffic into corresponding logical channels according to the matching result;
S2123: generating configuration information according to quality of service information within the data packets.

In an example, the UE first acquires the quality of service information in the traffic, and matches the services with different quality of service information requirements to the logical channels respectively. After the matching is completed, the UE can configure related contents of the logical channels according to the quality of service information, where the related contents may be a transmission distance of the logical channel, or priority of the logical channel, and so on. In an example, the UE, according to the QoS parameters carried in the data packets in the traffic, maps the data packets to different logical channels, where the mapping may be matching the data packets with corresponding logical channels according to the logical channels matched with the QoS parameters carried in the data packets, and different logical channels are configured with different transmission ranges according to the QoS parameters in the data packets. In an example, the minimum transmission distance required by the QoS parameters in the data packets corresponding to the logical channels LCH1 is X1 m, so the UE configures the minimum transmission distance of the LCH1 as X1 m according to this information.

Figure 7:
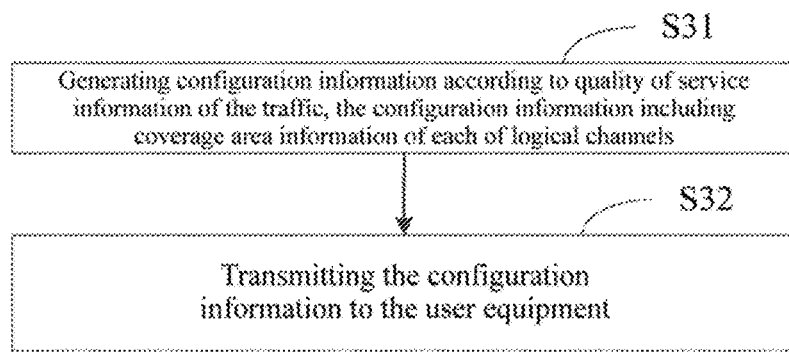
FIG. 7 illustrates a flowchart of a method of generating logical channel configuration information according to an embodiment of the present disclosure.

FIG. 7 illustrates a flowchart of a method of generating logical channel configuration information, which may be performed by a base station, according to an embodiment of the present disclosure. As shown in FIG. 7, the method may include:
S31: generating configuration information according to quality of service information of traffic, the configuration information including coverage area information of each of logical channels;
S32: transmitting the configuration information to the user equipment.

Figure 8:
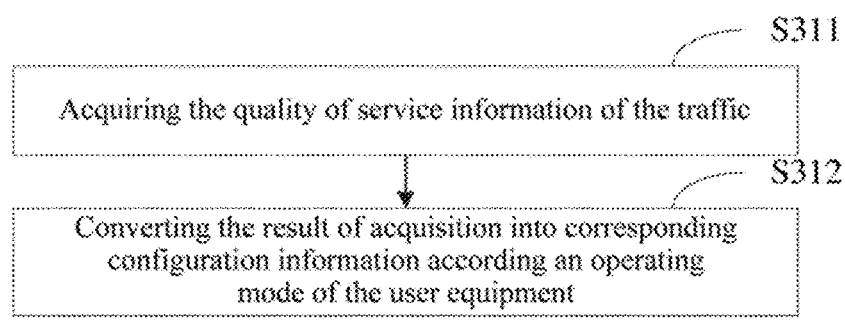
FIG. 8 illustrates a flowchart of a method of generating logical channel configuration information according to an embodiment of the present disclosure.

FIG. 8 shows a flowchart of a method of generating logical channel configuration information according to an embodiment of the present disclosure. As shown in FIG. 8, in a possible implementation, the generating configuration information according to quality of service information of traffic may include:
S311: acquiring the quality of service information of the traffic;
S312: converting a result of acquisition into corresponding configuration information according to an operating mode of the user equipment.

There are various ways for the base station to acquire the quality of service information of the traffic, which are not limited herein. Possible implementations may be to acquire the quality of service information according to a non-access stratum NAS message of a core network, or to acquire the quality of service information reported by the user equipment.

Figure 9:
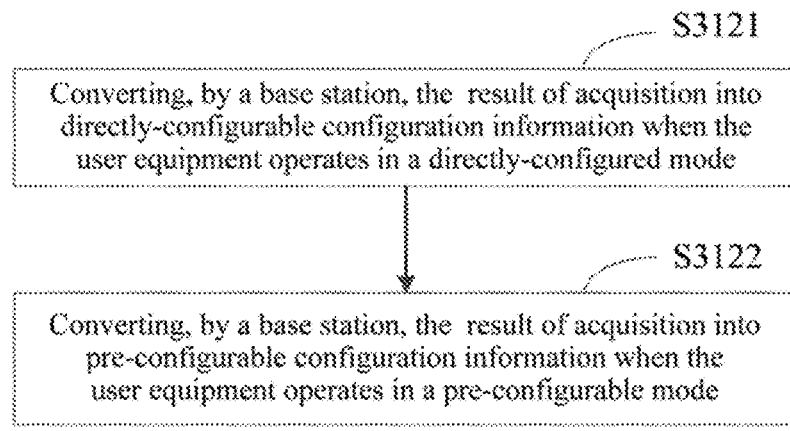
FIG. 9 illustrates a flowchart of a method of generating logical channel configuration information according to an embodiment of the present disclosure.

FIG. 9 shows a flowchart of a method of generating logical channel configuration information according to an embodiment of the present disclosure. As shown in FIG. 9, in a possible implementation, the converting a result of acquisition into corresponding configuration information according to an operating mode of the user equipment may include:
S3121: converting, by the base station, the result of acquisition into directly-configurable configuration information when the user equipment operates in a directly-configured mode;
S3122: converting, by the base station, the result of acquisition into pre-configurable configuration information when the user equipment operates in a pre-configurable mode.

In an example, there are two operating modes of the UE, i.e. mode1 and mode2 respectively, where mode1 is a directly-configurable mode. When the UE operates in the mode1, since the base station converts the result of acquisition into directly-configurable configuration information, the UE can directly configure related content of the logical channel by receiving the directly-configurable configuration information transmitted from the base station. There are various specific implementations, which are not limited herein. A possible implementation is achieved by LogicalChannelConfig IE. When the UE operates in the mode2, since the converted result at this time is pre-configurable configuration information, the UE configures related content of the logical channel according to the configuration information in a pre-configured manner at this time. In a possible example, the base station learns that the minimum transmission distance of one of the logical channels LCH1 is required to be X1 in the QoS parameters, and if the UE operates in the mode1, i.e., the directly-configurable mode, the base station directly transmits the logical channel configuration parameter to the UE through RRC signaling, and directly sets the minimum transmission distance of the LCH1 of the UE to X1 m. Where the directly-configurable mode means that the base station participates in the communication process of the UE, that is, the base station can directly control the communication of the UE and deliver the configuration information to the UE. In an example, the base station learns that the minimum transmission distance of one of the logical channels LCH1 is required to be X1 in the QoS parameters, and if the UE operates in the mode2 i.e. the pre-configurable mode, the base station configures the logical channel of the UE by pre-configuration, and the minimum transmission distance of the LCH1 of the UE is pre-configured to be X1 m. Where the pre-configuration means that the UE delivers the configuration information to the UE in advance. In an example, the base station learns that there are three kinds of corresponding traffic in the QoS parameter. Therefore, the three logical channels are configured as LCH1, LCH2 and LCH3, and the corresponding minimum transmission distances are X1, X2 and X3, respectively. At this time, the UE operates in the mode1, i.e., the directly-configurable mode, so the UE directly sets the minimum transmission distances of LCH1, LCH2 and LCH3 as X1 m, X2 m and X3 m, respectively.

In this way, the corresponding configuration information can be generated according to the quality of service information of the traffic so as to configure the logical channel. When the communication distance information between the UE and the base station or other UE is added to the quality of service information or other related parameters of the traffic, the communication distance information can be introduced into the configuration of the logical channel by generating corresponding configuration information, which provides a basis for subsequent logical channel scheduling, thereby ensuring the transmission distance requirement in the traffic and further the quality of service of the traffic.

Figure 10:
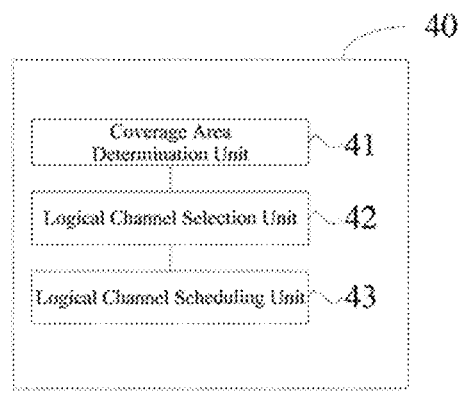
FIG. 10 illustrates a block diagram of a logical channel scheduling device according to an embodiment of the present disclosure.

FIG. 10 shows a block diagram of a logical channel scheduling device according to an embodiment of the present disclosure. As shown in FIG. 10, the device 40 comprises:
- a coverage area determination unit 41 configured to determine a coverage area of each of the logical channels according to configuration information of the respective logical channel, the configuration information including coverage area information of the logical channel;
- a logical channel selection unit 42 configured to select, according to a transmission distance of a grant, a logical channel whose coverage area matches the transmission distance; and
- a logical channel scheduling unit 43 configured to allocate a resource for the selected logical channel to complete scheduling.

In a possible implementation, the logical channel selection unit is configured to select, according to a transmission distance of the grant, a logical channel whose coverage area is within the transmission distance of the grant.

In a possible implementation, the device 40 further includes:
- a configuration information acquisition unit 44 configured to acquire configuration information according to quality of service information of traffic, the configuration information including coverage area information of each of the logical channels;
- a logical channel configuration unit 45 configured to configure the logical channel according to the configuration information.

In a possible implementation, the configuration information acquisition unit is configured to receive configuration information transmitted by a base station, the configuration information being generated by the base station according to the quality of service information of the traffic.

In a possible implementation, the configuration information acquisition unit is configured to generate configuration information according to the quality of service information of the traffic.

In a possible implementation, the generating configuration information according to the quality of service information of the traffic includes: matching traffic with different quality of service requirements to the logical channels; mapping data packet in the traffics into corresponding logical channel according to the matching result; generating configuration information according to the quality of service information within the data packets.

Figure 11:
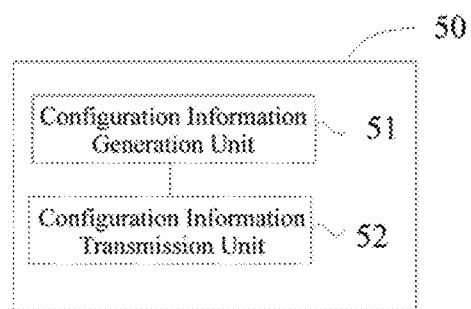
FIG. 11 illustrates a block diagram of a logical channel configuration information generation device according to an embodiment of the present disclosure.

FIG. 11 shows a block diagram of a logical channel configuration information generating device according to an embodiment of the present disclosure. As shown in FIG. 11, the device 50 includes:
- a configuration information generation unit 51 configured to generate configuration information according to quality of service information of traffic, the configuration information including coverage area information of each of logical channels;
- a configuration information transmission unit 52 configured to transmit the configuration information to a user equipment.

In a possible implementation, the configuration information generation unit is configured to acquire the quality of service information of the traffic; converting a result of the acquisition into corresponding configuration information according to an operating mode of the user equipment.

In a possible implementation, the converting a result of acquisition into the corresponding configuration information according to the operating mode of the user equipment includes: converting the result of acquisition into directly-configurable configuration information when the user equipment operates in a directly-configurable mode; converting the result of acquisition into pre-configurable configuration information when the user equipment operates in a pre-configurable mode.

Figure 12:
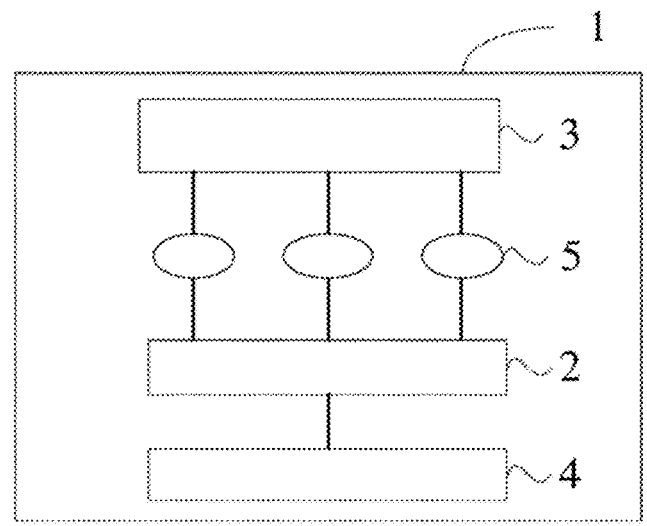
FIG. 12 illustrates a schematic diagram of an application example according to the present disclosure.

FIG. 12 shows a schematic diagram of an application example of the present disclosure. The application example is merely intended to facilitate understanding of embodiments of the present disclosure, and does not limit embodiments of the present disclosure.

As shown in FIG. 12, in the communication process of the user equipment UE 1, the internal information is transmitted among the layers, wherein the first layer is a physical layer 4, the second layer is a Media Access Control (MAC) layer 2, the third layer is the Radio Resource Control (RRC) layer 3, and a logical channel 5 is located between the MAC layer 2 and the RRC layer 3. During the transmission of information, the RRC layer 3 first configures each of the logical channels 5 existing in the UE 1 and generates corresponding configuration information, and the MAC layer 2 receives the configuration information generated by the RRC layer 3 and schedules each of the logical channels 5 according to the content of the configuration information.

In the communication process of UE 1, the communication partner may be a base station or other UE. In the communication process, since there is a communication distance between the UE 1 and the base station or other UE, the distance information between the UE 1 and the communication partner is added to the quality of service information of the V2X traffic.

In order to ensure the quality of communication, after the above distance information is added to the quality of service information, the RRC layer 3 may add corresponding coverage area information to the configuration information in the process of configuring the logical channel 5. In the present embodiment, in order to configure the coverage area of the logical channel 5, the UE 1 may instruct the RRC layer 3 to receive QoS parameters in the V2X service. After receiving the parameters, the RRC layer 3 first matches traffic with different QoS requirements to the logical channels, and after the matching is completed, configures the transmission distance of the logical channel 5 according to the parameter requirements of the corresponding logical channel 5 required in the QoS parameters. For example, in this example, the minimum transmission distance required by the QoS parameters corresponding to a certain logical channel is 500 m, so the RRC layer 3 configures the minimum transmission distance of the logical channel to 500 m.

After the RRC layer 3 completes the configuration of the coverage area of the logical channel 5, the MAC layer 2 may schedule the logical channel. Because the logical channel contains the configuration information, in the scheduling process, the MAC layer 2 determines the coverage area of each of the logical channels according to the coverage area information contained therein. In the scheduling process, the MAC layer 2 selects, according to transmission distance of the grant, a logical channel whose coverage area matches the transmission distance of the grant. The selected logical channels may be logical channels located within the transmission distance of the grant. For these selected logical channels, the MAC layer 2 performs a further filtering according to other information in the configuration content. The way of filtering is not unique, and may be to filter the logical channel containing SCS associated with the grant in the allowed SCS-List, or to filter the logical channel whose maximum physical uplink shared channel duration is not less than the physical uplink shared channel transmission duration associated with the grant, etc. After further filtering, for the selected logical channel, the MAC layer 2 allocates a resource for the logical channel according to related content in the configuration information, and may allocate a resource for the logical channel in descending order of priority of logical channels in the configuration information, etc.

Figure 13:
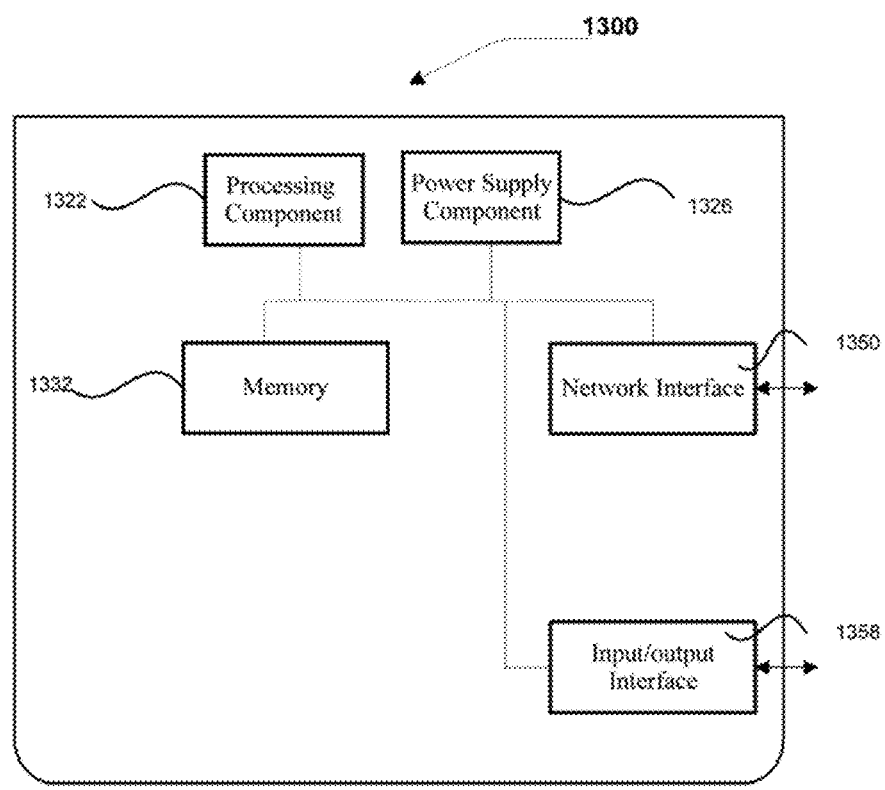
FIG. 13 illustrates a block diagram of a logical channel scheduling device according to an embodiment of the present disclosure.

FIG. 13 is a block diagram of a logical channel scheduling device 1300 according to an exemplary embodiment, and a logical channel configuration information generating device is also proposed in this example, the configuration of which may also refer to the device 1300 in FIG. 13. For example, the device 1300 may be provided as a server. Referring to FIG. 13, the device 1300 includes a processing component 1322, which further includes one or more processors, and memory resources represented by a memory 1332 for storing instructions, such as applications, that can be executed by the processing component 1322. The application programs stored in the memory 1332 may include one or more above modules each of which corresponds to a set of instructions. In addition, the processing component 1322 is configured to execute instructions to execute the above method.

The device 1300 may further include a power supply assembly 1326 configured to perform power management of the device 1300, a wired or wireless network interface 1350 configured to connect the device 1300 to a network, and an input/output (I/O) interface 1358. The device 1300 may operate based on an operating system stored in the memory 1332, such as Windows Server™, Mac OS X™, Unix™, Linux™, FreeBSD™, or the like.

In an exemplary embodiment, there is also provided a non-volatile computer-readable storage medium, such as a memory 1332 including computer program instructions that may be executed by the processing component 1322 of the device 1300 to complete the foregoing method.

The present disclosure may be implemented by a system, a method, and/or a computer program product. The computer program product may include a computer readable storage medium having computer readable program instructions for causing a processor to carry out the aspects of the present disclosure stored thereon.

The computer readable storage medium can be a tangible device that can retain and store instructions used by an instruction executing device. The computer readable storage medium may be, but not limited to, e.g., electronic storage device, magnetic storage device, optical storage device, electromagnetic storage device, semiconductor storage device, or any proper combination thereof. A non-exhaustive list of more specific examples of the computer readable storage medium includes: portable computer diskette, hard disk, random access memory (RAM), read-only memory (ROM), erasable programmable read-only memory (EPROM or Flash memory), static random access memory (SRAM), portable compact disc read-only memory (CD-ROM), digital versatile disk (DVD), memory stick, floppy disk, mechanically encoded device (for example, punch-cards or raised structures in a groove having instructions recorded thereon), and any proper combination thereof. A computer readable storage medium referred herein should not to be construed as transitory signal per se, such as radio waves or other freely propagating electromagnetic waves, electromagnetic waves propagating through a waveguide or other transmission media (e.g., light pulses passing through a fiber-optic cable), or electrical signal transmitted through a wire.

Computer readable program instructions described herein can be downloaded to individual computing/processing devices from a computer readable storage medium or to an external computer or external storage device via network, for example, the Internet, local area network, wide area network and/or wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing devices.

Computer readable program instructions for carrying out the operations of the present disclosure may be assembler instructions, instruction-set-architecture (ISA) instructions, machine instructions, machine-related instructions, microcode, firmware instructions, state-setting data, or source code or object code written in any combination of one or more programming languages, including an object oriented programming language, such as Smalltalk, C++ or the like, and the conventional procedural programming languages, such as the "C" programming language or similar programming languages. The computer readable program instructions may be executed completely on the user's computer, partly on the user's computer, as a stand-alone software package, partly on the user's computer and partly on a remote computer, or completely on a remote computer or a server. In the scenario with remote computer, the remote computer may be connected to the user's computer through any type of network, including local area network (LAN) or wide area network (WAN), or connected to an external computer (for example, through the Internet connection from an Internet Service Provider). In some embodiments, electronic circuitry, such as programmable logic circuitry, field-programmable gate arrays (FPGA), or programmable logic arrays (PLA), may be customized from state information of the computer readable program instructions; the electronic circuitry may execute the computer readable program instructions, so as to achieve the aspects of the present disclosure.

Aspects of the present disclosure have been described herein with reference to the flowchart and/or the block diagrams of the method, device (systems), and computer program product according to the embodiments of the present disclosure. It will be appreciated that each block in the flowchart and/or the block diagram, and combinations of blocks in the flowchart and/or block diagram, can be implemented by the computer readable program instructions.

These computer readable program instructions may be provided to a processor of a general purpose computer, a dedicated computer, or other programmable data processing devices, to produce a machine, such that the instructions create means for implementing the functions/acts specified in one or more blocks in the flowchart and/or block diagram when executed by the processor of the computer or other programmable data processing devices. These computer readable program instructions may also be stored in a computer readable storage medium, wherein the instructions cause a computer, a programmable data processing device and/or other devices to function in a particular manner, such that the computer readable storage medium having instructions stored therein comprises a product that includes instructions implementing aspects of the functions/acts specified in one or more blocks in the flowchart and/or block diagram.

The computer readable program instructions may also be loaded onto a computer, other programmable data processing devices, or other devices to have a series of operational steps performed on the computer, other programmable devices or other devices, so as to produce a computer implemented process, such that the instructions executed on the computer, other programmable devices or other devices implement the functions/acts specified in one or more blocks in the flowchart and/or block diagram.

The flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

What is claimed is:

1. A logical channel scheduling method, wherein the method is applied to user equipment, the method comprising:
    determining a coverage area of each of logical channels according to configuration information of the respective logical channel, the configuration information comprising coverage area information of the respective logical channel;
    selecting, according to a transmission distance of a grant, a logical channel whose coverage area matches the transmission distance; and
    allocating a resource for the selected logical channel to complete scheduling.

2. The logical channel scheduling method according to claim 1, wherein the selecting, according to a transmission distance of grant, a logical channel whose coverage area matches the transmission distance comprises:
    selecting, according to the transmission distance of grant, a logical channel whose coverage area is within the transmission distance of grant.

3. The logical channel scheduling method according to claim 1, wherein the method further comprising:
    acquiring configuration information according to quality of service information of traffic, the configuration information comprising coverage area information of each of the logical channels; and configuring the respective logical channel according to the configuration information.

4. The logical channel scheduling method according to claim 3, wherein the acquiring configuration information according to quality of service information of traffic comprises:
    receiving configuration information transmitted by a base station, the configuration information being generated by the base station according to the quality of service information of the traffic.

5. The logical channel scheduling method according to claim 3, wherein the acquiring configuration information according to quality of service information of traffic comprises:
    generating the configuration information according to the quality of service information of the traffic.

6. The logical channel scheduling method according to claim 5, wherein the generating configuration information according to quality of service information of traffic comprises:
    matching the traffic with different quality of service requirements to the logical channels;
    mapping data packets in the traffic into corresponding logical channels according to the matching result; and generating the configuration information according to quality of service information within the data packets.

7. A logical channel scheduling device, comprising:

a memory; and a processor coupled to the memory, wherein the processor is configured to:

determine a coverage area of each of logical channels according to configuration information of the respective logical channel, the configuration information comprising coverage area information of the respective logical channel;

select, according to a transmission distance of a grant, a logical channel whose coverage area matches the transmission distance; and allocate a resource for the selected logical channel to complete scheduling.

8. The logical channel scheduling device according to claim 7, wherein the processor is further configured to:

select, according to a transmission distance of the grant, a logical channel whose coverage area is within the transmission distance of the grant.

9. The logical channel scheduling device according to claim 7, wherein the the processor is further configured to:

acquire configuration information according to quality of service information of traffic, the configuration information comprises coverage area information of each of the logical channels; and configure the logical channel according to the configuration information.

10. The logical channel scheduling device according to claim 9, wherein the the processor is further configured to receive configuration information transmitted by a base station, the configuration information being generated by the base station according to the quality of service information of the traffic.

11. The logical channel scheduling device according to claim 9, wherein the processor is further configured to generate configuration information according to the quality of service information of the traffic.

12. The logical channel scheduling device according to claim 11, wherein to generate configuration information according to the quality of service information of the traffic comprises:

matching the traffic with different quality of service requirements to the logical channels;

mapping data packets in the traffic into corresponding logical channels according to the matching result; and generating the configuration information according to quality of service information within the data packets.

13. A non-transitory computer readable storage medium having stored thereon computer program instructions, wherein the computer program instructions, when executed by a processor, implement operations comprising:

determining a coverage area of each of logical channels according to configuration information of the respective logical channel, the configuration information comprising coverage area information of the respective logical channel;

selecting, according to a transmission distance of a grant, a logical channel whose coverage area matches the transmission distance; and allocating a resource for the selected logical channel to complete scheduling.

\* \* \* \* \*